United States Patent

[11] 3,581,167

| [72] | Inventors | Donald J. Veater;<br>Sumner B. Hill; Lawrence J. Ruffner, all of State College, Pa. |
|---|---|---|
| [21] | Appl. No. | 11,929 |
| [22] | Filed | Feb. 19, 1970 |
| [45] | Patented | May 25, 1971 |
| [73] | Assignee | Erie Technological Products, Inc.<br>Continuation of application Ser. No. 761,436, Sept. 23, 1968, now abandoned. |

[54] REINFORCED CERAMIC CAPACITOR AND METHOD OF MAKING THE SAME
7 Claims, 6 Drawing Figs.

[52] U.S. Cl. ................................................. 317/261, 29/25.42
[51] Int. Cl. ............................................................ H01g 1/13
[50] Field of Search ........................................... 317/261, 258; 29/25.42

[56] References Cited
UNITED STATES PATENTS
| 3,002,137 | 8/1961 | Kahn | 317/261 |
| 3,258,665 | 6/1966 | Sperry | 317/249(D) |
| 3,244,951 | 4/1966 | Wallace | 317/261UX |
| 3,310,719 | 3/1967 | Seney | 317/261X |

FOREIGN PATENTS
| 507,143 | 6/1939 | Great Britain | 317/261 |
| 1,068,319 | 4/1967 | Great Britain | 317/261 |

*Primary Examiner*—Elliot A. Goldberg
*Attorney*—Ralph Hammar

ABSTRACT: A capacitor having an extremely thin central layer (as little as 0.0002 inches) with electrodes sintered on both faces and surrounded by ceramic margins. The central layer is sandwiched between thick outer ceramic layers in face to face engagement with the electrodes and margins with the margins sintered to the outer ceramic layers to provide a unitary ceramic assembly. The outer layers have perforations providing access to the electrodes and have terminal coatings which extend into the perforations to make contact with the electrodes. Leads are soldered to and extend from the terminal coatings.

PATENTED MAY 25 1971  3,581,167

INVENTOR
Donald J Veater
Sumner B Hill
Lawrence J Ruffner
BY
Ralph Hammar
ATTORNEY

REINFORCED CERAMIC CAPACITOR AND METHOD OF MAKING THE SAME

This application is a continuation of Ser. No. 761,436 filed Sept. 23, 1968 now abandoned.

This invention is intended to increase the capacity of ceramic capacitors by a laminated construction consisting of a thin central ceramic layer sandwiched between two outer thick ceramic layers. The capacitor electrodes are sintered to opposite faces of the central layer and the outer layers which are in face to face engagement with the electrodes and margins are sintered to the central layer to provide a unitary ceramic assembly of adequate mechanical strength. Terminal coatings on the outer surfaces of the outer ceramic layers are soldered to leads which extend from the coatings. The terminal coatings make contact with the electrodes through perforations which extend to the electrodes.

Figure 1:
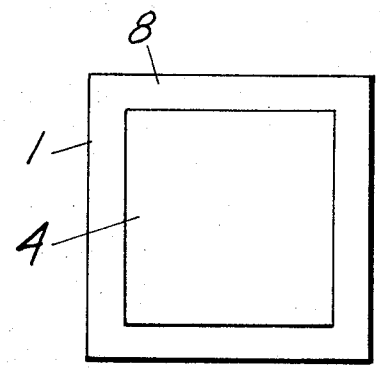
Figure 3:
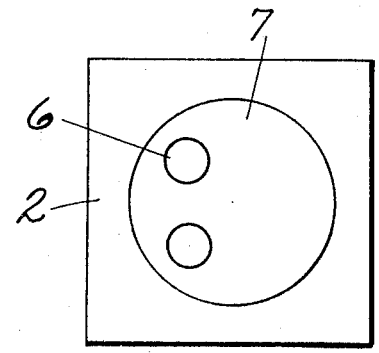
Figure 2:
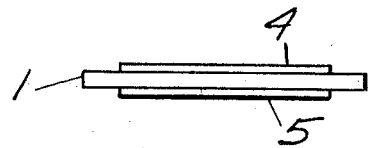
Figure 4:
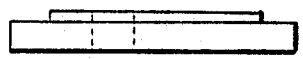
Figure 5:
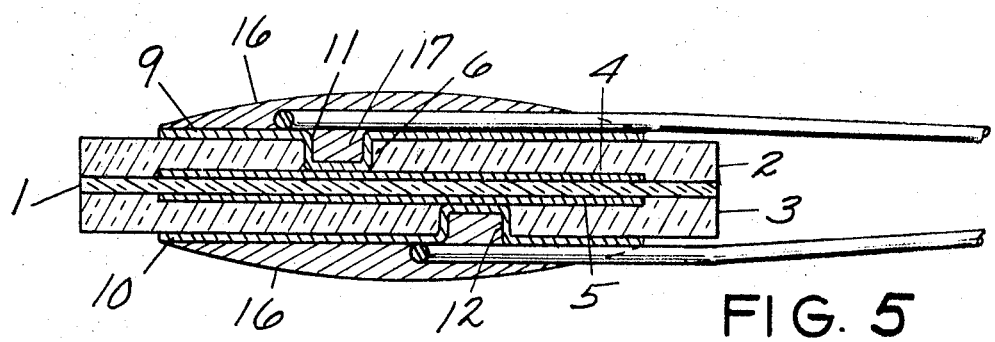
Figure 6:
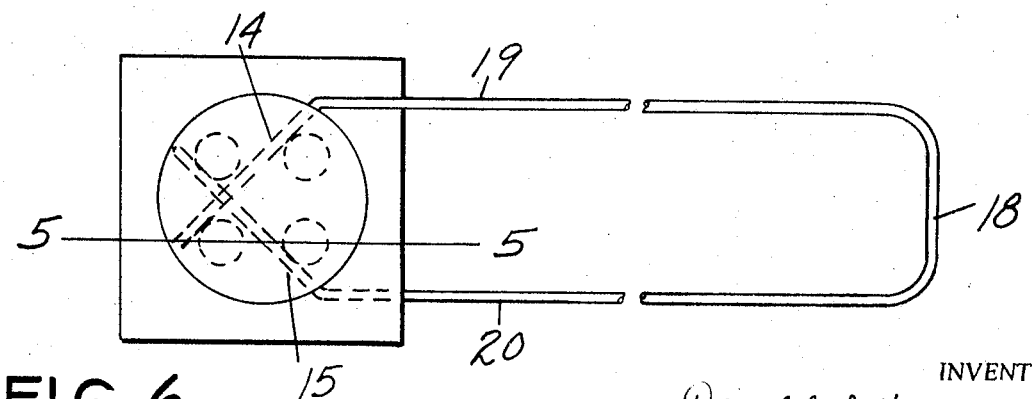

In the accompanying drawing, FIG. 1 is a plan view of the central layer of the ceramic capacitor, FIG. 2 is an edge view of the central layer, FIG. 3 is a plan view of one of the outer layers of the capacitor, FIG. 4 is an edge view of FIG. 3, FIG. 5 is a section through a finished capacitor taken on lines 5–5 of FIG. 6, FIG. 6 is a plan view of a finished capacitor.

The capacitor consists of a central ceramic layer 1 sandwiched between two outer layers 2, 3. On opposite faces of the central layer are painted metallic electrodes 4, 5 which are sintered to the central layer at the ceramic firing temperature. For titanate ceramic requiring a high firing temperature, the electrodes 4, 5 might be of one of the platinum-palladium paints while for ceramics requiring a lower firing temperature, other metals might be used. The outer layers 2, 3 are of the same ceramic as the central layer 1 or at least of a ceramic compatible with the central layer. Each outer layer 2, 3 has one or more perforations 6 extending in the thickness direction through the layer in the region to which a terminal coating 7 is to be applied.

In the manufacture of the capacitor, the electrodes 4, 5 are painted on opposite sides of a green ceramic central layer 1. The electrodes are painted so as to leave a margin 8 surrounding the electrodes. The central layer 1 is then sandwiched between green ceramic outer layers 2, 3. So long as the outer layers register with the central layer, no particular orientation is required. The perforations 6 on opposite sides of the layer 1 are shown out of register with each other in FIG. 6. The assembly is then pressed together to insure intimate contact between the outer layers 2, 3 and the margin 8 surrounding the electrodes 4, 5. The assembly is then fired at ceramic firing temperatures to sinter the electrodes 4, 5 to the central layer 1 and to sinter or unite the outer layers 2, 3 to the margin 8 of the central layer 1. At the end of the firing operation, the assembly is a unitary ceramic with the margins 8 sealed to the outer layers of ceramic and with the electrodes in intimate contact with the central layer. There is no tendency for the electrodes 4, 5 to separate or delaminate from the layer 1. Since the layers 2, 3 do not contribute to the capacitance of the unit, any tendency to delamination of the layers 2, 3 will have no effect upon the capacitance.

The sealed margin 8 provides humidity protection since the opposing electrodes of opposite polarity are buried within the unit, and moisture cannot penetrate to the edges of the dielectric, where humidity failure normally occurs with an ordinary single sheet dielectric. This is an important advantage for capacitors which are used under conditions of high heat and humidity. The sealed margins also reduce or eliminate corona.

The capacity of the assembly is determined by the thickness of the central layer 1 and the overlapping area of the electrodes 4, 5. Because of the mechanical support provided by the outer layers 2, 3 the layer 1 can be of extreme thinness. The layer 1 may have a thickness as little as 0.0002 inch and usually will not exceed 0.003 inch thickness. The layer 1 is much too thin to permit handling if it were separately fired. The mechanical strength of the assembly is derived from the outer layers 2, 3 which have a thickness such that the overall thickness of the complete ceramic assembly provides adequate strength for firing and subsequent handling. While the layers 2, 3 could have a thickness of as little as 3 mils, it will ordinarily be more convenient to have these layers in the range of from 5 to 10 mils so that the complete assembly will be a rugged part. The mechanical strength may be further increased by using ceramics for the outer layers 2, 3 which have less shrinkage during sintering than the central layer 1. This places the outer layers in compression.

The dielectric strength of the central layer 1 which is in the range of from 300 to 50 volts per mil of thickness permits the capacitors to be conservatively rated at a voltage of from 50 to 100 volts per mil. thickness of the layer 1. On reason this rating is possible is that the fused ceramic margins 8 surrounding the electrodes 4, 5 permit the capacitor to be rated on its voltage breakdown through the thickness of the layer 1 rather than on the basis of the voltage breakdown over the edge of the layer 1.

At the end of the firing operation, portions of the electrodes 4, 5 are accessible through the holes 6 in the outer layers 2, 3 so that the capacitance of the fired unit can be measured. By providing several holes, one or more of which occupies a known percentage of the electrode area, it is possible to make an adjustment of the capacitance of the fired unit in order to bring it within the desired tolerance. For example, if one of the holes 6 had an area equal to 10 percent of the area of electrodes 4, 5, it would be possible to effect a 10 percent adjustment in the capacitance of the fired unit by removing all of the portion of the electrode exposed at the bottom of the hole. This could be conveniently done by a sandblasting operation.

The capacitor terminals are applied, for example in the form of a silver paint, within the area indicated at 7 in FIG. 3. The silver paint as shown at 11 and 12 runs into the holes 6 and makes contact with the outer surface of the electrode coating. After painting the terminals 9, 10, the silver paint is baked to mature the paint and to provide a surface to which solder connections may be made. Capacitor leads such as the hairpin lead 13 having crossover or X ends 14, 15 are soldered to the terminals 9, 10 by the usual dip soldering operation in which the terminals 9, 10 are gripped between the crossover ends while the capacitor is dipped in solder. The ends 14, 15 of the leads lie flat on the terminal surfaces and are firmly held in place by the solder 16. The grip of the solder on the terminals is further increased by the solder which runs into the openings or holes 6 as shown at 17. At the completion of the soldering operation, the arch 18 of the lead 13 is cut, leaving ends 19, 20 which extend edgewise beyond the capacitor for making electrical connections into a circuit.

The adjustment of capacity as described above is made either after the firing of the silver paint or after soldering. If the removal of the electrode at the bottom of the selected hole 6 is done before the application of the silver paint, the electrode areas removed for adjustment will be filled in with the silver paint and the capacitance will return to what it was before adjustment. Adjustment after firing of the silver paint is not nullified by the subsequent soldering operation. Adjustment may be made wither after the silver firing or after soldering.

There are several advantages of the capacitor unit. It has a higher voltage rating because the edges of the capacity determining layer 1 are sealed in ceramic and the capacitor may be rated on its voltage breakdown in the thickness direction rather than on the lesser over edge breakdown voltage. The sealing also improves the rating of the capacitor under high humidity conditions. There is no way for moisture to get into the ceramic. Painting the electrodes 4, 5 on opposite sides of the capacity determining layer 1 minimizes delamination and thereby prevents loss of capacitance due to the loss of intimate contact between the electrodes 4, 5 and the layer 1. Any tendency to delamination takes place between the outer layers 2, 3 which do not enter into the capacitance. The capacitor is not subject to silver migration which could cause breakdown. Reaction between the ceramic of layer 1 and the frit in the paint for the terminals 9, 10 is eliminated.

What We claim is:

1. A ceramic capacitor unit consisting essentially of a sinter united laminate having a central ceramic layer sandwiched between two outer ceramic layers of a ceramic compatible with the central layer, the central layer being imperforate and having a thickness too thin to be handled if separately fired, a pair of metal paint electrodes sintered respectively to opposite faces of the central layer, each electrode covering at least major surfaces of the central layer, at least portions of said electrodes being in capacity relation to each other through the thickness of the central layer and spaced from the periphery of the central layer to provide a margin of ceramic surrounding each of the electrodes, said outer layers each having a thickness of 3 mils or more and respectively having one face overlying and in contact with one and the other of the electrodes and its margin of ceramic, the outer layers having perforations opposite and occupying a minor portion of the area of said electrodes and spaced from the periphery of said layers and extending in the thickness direction through each outer layer but not through the electrode with which it is in contact, the layers and electrodes being a unitary sintered ceramic structure with each of the margins of the central layer fused to the outer layer with which it is in contact to seal the edges of the central ceramic layer in ceramic to prevent voltage breakdown over the edge of the central layer and to prevent penetration of moisture, metal paint terminal layers on the faces of each outer layer remote from the central layer, said terminal layers providing surfaces to which solder connections may be made and extending into the perforations and into contact with the electrodes.

2. The capacitor of claim 1 in which one or more of the perforations is opposite and therefore makes accessible through said perforations a portion of the electrode area of one of the electrodes in capacity relation to the other electrode so said accessible portion may be removed to reduce the capacity after the metal terminal layers have been applied and after removal of the portion of the metal terminal layer overlying said portion of the electrode area.

3. The capacitor of claim 1 in which the outer layers have less shrinkage during sintering than the central layer so that the outer layers are placed under compression to increase the mechanical strength of the capacitor.

4. The capacitor of claim 1 made by the method which consists of stacking the ceramic layers of the laminate in the green state with the central layer painted with the electrodes prior to stacking and with the perforations in the outer layers opposite the electrodes and subjecting the laminate of stacked layers to ceramic firing and thereafter applying to the surfaces of the outer layers of the fired laminate remote from the central layer the terminal layers providing surfaces to which solder connections may be made.

5. The capacitor of claim 4 in which the capacity of the unit is adjusted by removal of a portion of the electrode area of one of the electrodes accessible through one of said perforations and in capacity relation to the other electrode after removal of the portion of the metal terminal layer overlying said portion of the electrode area.

6. A ceramic capacitor unit consisting essentially of a sinter united laminate having a central ceramic layer sandwiched between two outer ceramic layers of a ceramic compatible with the central layer, the central layer being imperforate and having a thickness too thin to be handled if separately fired, a pair of metal paint electrodes sintered respectively to opposite faces of the central layer, said electrodes being in capacity relation to each other through the thickness of the central layer and spaced from the periphery of the central layer to provide a margin of ceramic surrounding each of the electrodes, said outer layers each having a thickness of 3 mils. or more and respectively having one face overlying and in contact with one and the other of the electrodes and its margin of ceramic, the outer layers having perforations opposite and occupying a minor portion of the area of said electrodes and spaced from the periphery of said layers and extending in the thickness direction through each outer layer but not through the electrode with which it is in contact, the perforations on opposite sides of the central ceramic layer being out of register with each other, the layers and electrodes being a unitary sintered ceramic structure with each of the margins of the central layer fused to the outer layer with which it is in contact to seal the edges of the central ceramic layer in ceramic to prevent voltage breakdown over the edge of the central layer and to prevent penetration of moisture, metal paint terminal layers on the faces of each outer layer remote from the central layer, said terminal layers providing surfaces to which solder connections may be made and extending into the perforations and into contact with the electrodes.

7. The capacitor of claim 6 in which there is more than one perforation in one of the outer layers and at least one perforation in the other outer layer.